United States Patent
Baragaba et al.

(10) Patent No.: US 11,451,575 B2
(45) Date of Patent: Sep. 20, 2022

(54) METHOD AND SYSTEM FOR DETERMINING CYBERSECURITY MATURITY

(71) Applicant: SAUDI ARABIAN OIL COMPANY, Dhahran (SA)

(72) Inventors: Mazen A. Baragaba, Dhahran (SA); Muhammad S. Aljuaid, Dhahran (SA); Marek Zidek, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 223 days.

(21) Appl. No.: 16/943,554

(22) Filed: Jul. 30, 2020

(65) Prior Publication Data
US 2022/0038486 A1    Feb. 3, 2022

(51) Int. Cl.
*H04L 29/00* (2006.01)
*H04L 9/40* (2022.01)

(52) U.S. Cl.
CPC ........ *H04L 63/1433* (2013.01); *H04L 63/083* (2013.01); *H04L 63/20* (2013.01)

(58) Field of Classification Search
CPC ... H04L 63/1433; H04L 63/083; H04L 63/20; H04L 41/0853; H04L 43/12; H04L 67/34
See application file for complete search history.

(56) References Cited

U.S. PATENT DOCUMENTS

| | | | |
|---|---|---|---|
| 8,869,116 B2* | 10/2014 | Fliek | G06F 11/3664 717/125 |
| 9,367,810 B1* | 6/2016 | Gagne | H04L 41/16 |
| 9,386,033 B1* | 7/2016 | Rossman | H04L 41/0893 |
| 10,027,711 B2 | 7/2018 | Gill et al. | |

(Continued)

FOREIGN PATENT DOCUMENTS

| | | |
|---|---|---|
| AU | 2018-102106 A4 | 1/2019 |
| WO | 2019/160905 A1 | 8/2019 |

OTHER PUBLICATIONS

International Search Report and Written Opinion issued in Application No. PCT/US2021/043901, dated Nov. 5, 2021 (12 pages).

(Continued)

*Primary Examiner* — Don G Zhao
(74) *Attorney, Agent, or Firm* — Osha Bergman Watanabe & Burton LLP

(57) ABSTRACT

A method may include obtaining first cybersecurity data using a hardware probe disposed within a network. The first cybersecurity data may correspond to an analysis of the hardware probe regarding network data that is transmitted through the network. The method may further include obtaining second cybersecurity data using a software probe operating on a network element within the network. The second cybersecurity data may correspond to an analysis of the software probe regarding one or more configuration settings of the network element. The method may further include determining a cybersecurity maturity score using the first cybersecurity data and the second cybersecurity data. The cybersecurity maturity score may be based on a maturity model. The method may further include transmitting, based on the cybersecurity maturity score, a remediation command that adjusts a configuration setting of the network.

20 Claims, 5 Drawing Sheets

(56) References Cited

U.S. PATENT DOCUMENTS

| | | | | |
|---|---|---|---|---|
| 10,296,750 | B1* | 5/2019 | Rossman | G06F 16/2365 |
| 10,339,321 | B2* | 7/2019 | Tedeschi | G06Q 10/06393 |
| 2010/0095235 | A1* | 4/2010 | Bennett | G06Q 99/00 |
| | | | | 715/781 |
| 2011/0276406 | A1* | 11/2011 | Sneyders | G06Q 30/02 |
| | | | | 705/26.1 |
| 2012/0011077 | A1 | 1/2012 | Bhagat | |
| 2014/0081680 | A1* | 3/2014 | Telle | G06Q 10/063 |
| | | | | 705/7.11 |
| 2015/0281287 | A1 | 10/2015 | Gill et al. | |
| 2016/0381058 | A1* | 12/2016 | Antony | G06F 21/53 |
| | | | | 726/23 |
| 2017/0078321 | A1* | 3/2017 | Maylor | H04L 63/1433 |
| 2017/0134411 | A1 | 5/2017 | Ye | |
| 2017/0330197 | A1 | 11/2017 | DiMaggio et al. | |
| 2017/0346846 | A1 | 11/2017 | Findlay | |
| 2018/0246926 | A1* | 8/2018 | Altaf | G06F 16/215 |
| 2019/0180039 | A1* | 6/2019 | Considine | G06Q 10/0635 |
| 2019/0199744 | A1 | 6/2019 | Nides et al. | |
| 2019/0205542 | A1* | 7/2019 | Kao | G06F 8/70 |
| 2019/0207968 | A1 | 7/2019 | Heckman et al. | |
| 2019/0207981 | A1* | 7/2019 | Sweeney | H04L 41/0816 |
| 2019/0258807 | A1* | 8/2019 | DiMaggio | G06F 21/577 |
| 2019/0312890 | A1 | 10/2019 | Perilli | |
| 2020/0021620 | A1* | 1/2020 | Puratheppparambil | |
| | | | | H04L 63/102 |
| 2020/0137110 | A1* | 4/2020 | Tyler | H04L 63/1483 |
| 2020/0358798 | A1* | 11/2020 | Maylor | H04L 63/1425 |
| 2021/0329033 | A1* | 10/2021 | Jeffery | G06N 3/08 |

OTHER PUBLICATIONS

Proenca, D. et al.; "Information Security Management Systems—A Maturity Model based on ISO/IEC 27001" (12 pages).
Homeland Security; "Dams Sector Cybersecurity Capability Maturity Model Version 1.0"; 2016 (84 pages).
CIS-SecureSuite; https://www.cisecurity.org/cis-securesuite/ Jul. 30, 2020 (3 pages).

* cited by examiner

METHOD AND SYSTEM FOR DETERMINING CYBERSECURITY MATURITY

BACKGROUND

Cybersecurity may include the protection of an organization's data or/and infrastructure from both outside threats as well as individuals within an organization that may compromise the data, cause denial of service or other sort of attacks. Quantifying these threats, preventing them and responding to them if occurred as part of an overall risk management is an important aspect to identifying an organization's cybersecurity state. Accordingly, it is commonly needed among many organizations to continuously benchmark their cybersecurity state against an international or customized standard or framework to identify how mature their cybersecurity state is, how much they are in compliant with recommended practices and where the areas of improvements are.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, first cybersecurity data using a hardware probe disposed within a network. The first cybersecurity data corresponds to an analysis of the hardware probe regarding network data that is transmitted through the network. The method further includes obtaining, by the computer processor, second cybersecurity data using a software probe operating on a network element within the network. The second cybersecurity data corresponds to an analysis of the software probe regarding one or more configuration settings of the network element. The method further includes determining, by the computer processor, a cybersecurity maturity score using the first cybersecurity data and the second cybersecurity data. The cybersecurity maturity score is based on a maturity model. The method further includes transmitting, by the computer processor and based on the cybersecurity maturity score, a remediation command that adjusts a configuration setting of the network.

In general, in one aspect, embodiments relate to a system that includes a network that includes various network elements, a hardware probe coupled to the network elements. The system further includes a network element coupled to the network elements, where the network element includes a software probe. The system further includes a cybersecurity maturity manager that includes a computer processor. The cybersecurity maturity manager is coupled to the hardware probe, the software probe, and the network elements. The cybersecurity maturity manager obtains first cybersecurity data using the hardware probe. The first cybersecurity data corresponds to an analysis of the hardware probe regarding network data that is transmitted through the network. The cybersecurity maturity manager obtains second cybersecurity data using the software probe. The second cybersecurity data corresponds to an analysis of the software probe regarding one or more configuration settings of the network element. The cybersecurity maturity manager determines a cybersecurity maturity score using the first cybersecurity data and the second cybersecurity data. The cybersecurity maturity score is based on a maturity model. The cybersecurity maturity manager transmits, based on the cybersecurity maturity score, a remediation command that adjusts a configuration setting of the network element.

In general, in one aspect, embodiments relate to a non-transitory computer readable medium storing instructions executable by a computer processor. The instructions obtain first cybersecurity data using a hardware probe disposed within a network. The first cybersecurity data corresponds to an analysis of the hardware probe regarding network data that is transmitted through the network. The instructions obtain second cybersecurity data using a software probe operating on a network element within the network. The second cybersecurity data corresponds to an analysis of the software probe regarding one or more configuration settings of the network element. The instructions determine a cybersecurity maturity score using the first cybersecurity data and the second cybersecurity data. The cybersecurity maturity score is based on a maturity model. The instructions transmit, based on the cybersecurity maturity score, a remediation command that adjusts at least one configuration setting of the network.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
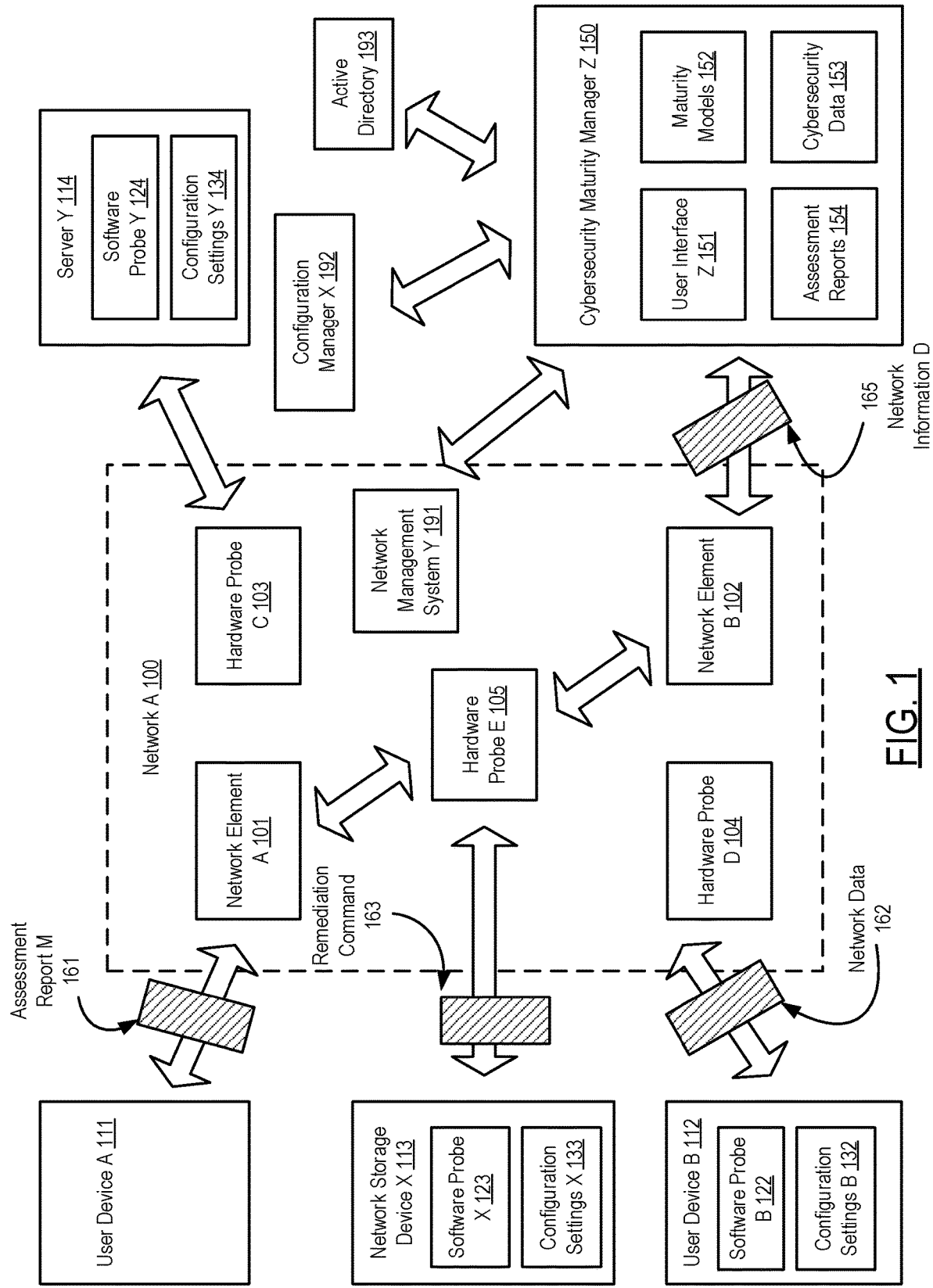
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for autonomously performing a cybersecurity assessment of assessment of infrastructure, endpoints, and other organization aspects. The infrastructure may include communication infrastructure (such as cellular wireless network links or leased lines or satellite links), network infrastructure (such as switches, routers and links between them), computing infrastructure (such as servers and storage devices that include premise-based or cloud-based devices), and/or cybersecurity infrastructure (such as Firewalls, IDS, IPS, etc.). The endpoints may include user devices (e.g., PCs, mobile devices) or peripherals. Other organization aspects may include the availability of approved cybersecurity strategies, policies, procedures and workforce certifications. For brevity, "infrastructure and endpoints" (or "network or organization") may be used afterwards to imply the holistic scope mentioned above.

Furthermore, a cybersecurity assessment may determine whether infrastructure, endpoints, and other organization aspects comply with one or more security standards as well as an overall level of cybersecurity maturity with the organization. To perform a cybersecurity assessment, multiple hardware probes and multiple software probes may be disposed around a network in order to collect data for analyzing cybersecurity risks as well as detect changes to the cybersecurity state of the network. For example, hardware probes may monitor inline network traffic as the data passes through particular nodes along a network path. On the other hand, software probes may be installed on various network elements to monitor configuration settings and other system data in order to provide a security picture of the infrastructure system or endpoints in a network. More specifically, a cybersecurity assessment may use one or more maturity models that provide a metric for analyzing specific cybersecurity areas of an organization as well as for determining an overall cybersecurity picture of the organization against one or more cybersecurity standards or frameworks.

Furthermore, some embodiments include a cybersecurity maturity manager that provides an autonomous process that determines cybersecurity maturity scores and compliance with security standards. In contrast, where a cybersecurity assessment is conducted manually by using a human assessor, a cybersecurity maturity manager may provide a hardware and/or software implementation on a network that reduces the amount of human subjectivity involved in assessments. Where a human assessor may sample a small selection of evidence to evaluate cybersecurity risks, a cybersecurity maturity manager may obtain a complete and accurate picture of a network or organization using multiple probes. Because a human assessor's determination may be dependent on an assessor's judgment, the cybersecurity maturity manager may provide a repeatable objective assessment that eliminates human intervention through autonomous processes. Accordingly, a cybersecurity maturity manager may assess cybersecurity maturity through extensive data collection and consistent application of maturity metrics.

Turning to FIG. 1, FIG. 1 shows a schematic diagram in accordance with one or more embodiments. As shown in FIG. 1, a network (e.g., network (100)) may be coupled to various user devices (e.g., user device A (111), user device B (112)), one or more servers (e.g., server Y (114)), a network storage device (e.g., network storage device X (113)), various network elements (e.g., network element A (101), network element B (102)). A network element may refer to various hardware components within a network, such as switches, routers, and hubs, as well as user devices, servers, network storage devices, user equipment, or any other logical entities for uniting one or more physical devices on the network. User devices may include personal computers, smartphones, human machine interfaces, and any other devices coupled to a network that obtain inputs from one or more users. In some embodiments, a network includes a cybersecurity maturity manager (e.g., cybersecurity maturity manager Z (150)). A cybersecurity maturity manager may include hardware and/or software that includes functionality for determining cybersecurity risks and/or remediating the cybersecurity risks, such as implementing security protocols against cyberattacks, etc. In some embodiments, a cybersecurity maturity manager, network elements, user equipment, user devices, servers, and/or a network storage device may be computing systems similar to the computing system (500) described in FIGS. 5A and 5B, and the accompanying description.

In some embodiments, a network includes one or more hardware probes (e.g., hardware probe C (103), hardware probe D (104), hardware probe E (105)). In particular, a hardware probe may include hardware that includes functionality to monitor inline data transmissions, such as data sent between endpoints communicating over network paths or data sent between network elements as shown in hardware probe E (105). For example, hardware probe D (104) may perform a packet analysis on network data (162) that is transmitted by user device B (112) to server Y (114) to determine one or more security vulnerabilities or noncompliance with one or more security protocols. Thus, various hardware probes may collect network information regarding security control implementations, security protocols, and other types of security information directly from network traffic. Hardware probes may further transmit such network information (e.g., network information D (165)) to a cybersecurity maturity manager for further analysis.

In some embodiments, for example, a cybersecurity maturity manager includes functionality for determining whether encryption is implemented with respect to a particular type of network communication (e.g., whether a particular software application is encrypting confidential data prior to transmission). As such, a hardware probe may include hardware that performs a packet analysis to identify and categorize inbound and outbound running applications by monitoring network traffic. Thus, hardware probes determine a presence and/or violation of one or more security metrics through a packet analysis. In some embodiments, for example, a hardware probe detects a transmission of a clear text password by monitoring network data. Accordingly, a hardware probe may identify an unencrypted network communication as being confidential or another protected data type in order to determine an existence of a cybersecurity risk, such as security vulnerabilities, security standard violations, etc. Thus, hardware probes may identify devices within a network and their respective cybersecurity risks based on analyzing network traffic.

In some embodiments, a network includes one or more software probes. For example, a software probe may be software installed on a network element (e.g., software probe B (122) on user device B (112), software probe Y (124)) for monitoring potential security vulnerabilities associated with the network element. For example, a software probe may include functionality to identify various configuration settings (e.g., configuration settings B (132), configuration settings X (133), configuration settings Y (134)), such as security controls, network communication settings, and/or various security protocols performed using the network element. In some embodiments, a software probe may compare configuration settings to one or more predetermined security policies, security controls, and/or baselines to identify compliance issues and other security vulnerabilities.

Returning to the cybersecurity maturity manager, a cybersecurity maturity manager may include hardware and/or software that includes functionality for collecting cybersecurity data (e.g., cybersecurity data (153)) over a network using various hardware probes and software probes. In some embodiments, a cybersecurity maturity manager obtains cybersecurity data by interfacing and extracting information from other management systems in a network or among an organization's infrastructure. In particular, a cybersecurity maturity manager may request information from an Active Directory (e.g., Active Directory (193)), a network management system (e.g., network management system Y (191)) and/or a configuration management system (e.g., configuration manager X (192)). In some embodiments, a cybersecurity maturity manager is implemented in a cloud computing environment by a cloud server, where the cloud server may obtain the data from various probes over various internet connections. Cybersecurity data may include data that identifies various cybersecurity risks, such as security vulnerabilities, security standard violations, etc. For example, cybersecurity data may be the result of analyzing network data to determine whether the network data violates one or more security standards. Where cybersecurity data may be generated by a cybersecurity maturity manager, in some embodiments, hardware probes and/or software probes may directly generate the cybersecurity data.

In some embodiments, a cybersecurity maturity manager obtain user inputs from one or more user devices regarding cybersecurity risks, security standard violations, evidence for the implementation of a security control or other missing information that cannot be obtained autonomously. For example, a cybersecurity maturity manager may collect information from various cybersecurity analysts to determine a presence of a cybersecurity risk. In some embodiments, a cybersecurity maturity manager includes hardware and/or software for determining a maturity assessment of a network or organization using one or more maturity models (e.g., maturity models (152)). For example, a cybersecurity maturity manager may generate a maturity assessment of a network using analysis results to determine a general cybersecurity picture of the network. This maturity assessment may be based on one or more templates corresponding to a security standard or framework.

In some embodiments, for example, a security standard may be an information security standard provided by Center for Information Security (CIS) or the National Institute of Standards and Technology (NIST) regarding critical security controls. Likewise, another security standard example may be the 2005 or 2013 version of the International Organization for Standardization (ISO) 270001 standard, or an enterprise specific standard. Moreover, a security standard may define a security policy, an asset management protocol, human resources, physical and environmental security, access control, information security incident management, and/or various compliance protocols. Example maturity models may include a capability maturity model integration (CMMI), a cybersecurity capability maturity model (C2M2), standardization's systems security engineering capability maturity model (SSE-CMM), or a customized model.

Keeping with maturity models, a maturity model may include multiple maturity levels for assessing the cybersecurity state of a network or organization. For example, a CMMI may include an initial maturity level that corresponds to security processes being unpredictable and reactive ("Initial Stage"). Another maturity level may correspond to organized project management with regard to cybersecurity ("Managed Stage"). Another maturity level may correspond to a defined stage, where cybersecurity is proactive through network-wide standards ("Defined Stage"). Another maturity level may correspond to a quantitatively-managed stage where a network operates using quantitative data to determine predictable security processes that align with stakeholder needs ("Quantitatively Managed Stage"). Another maturity level may correspond to an optimizing stage, where a network or organization's cybersecurity state is constantly increasing performance and responding to new risks or other security opportunities ("Optimized Stage"). In an optimizing stage, for example, a network's cybersecurity state may be stable, which may provide for more "agility and innovation" within a cybersecurity environment.

In some embodiments, a maturity model includes multiple measurement domains. For example, a C2M2 model may include the following measurement domains for assessing cybersecurity maturity: degree of risk management; degree of asset, change, and configuration management; degree of identity and access management; degree of threat and vulnerability management; degree of situational awareness; degree of information sharing and communications; degree of event and incident response; degree of continuity of operations; degree of supply chain and external dependencies management; and degree of workforce management and cyber security program management. Using these measurement domains, a C2M2 may determine individual maturity scores for respective measurement domains that provide a self-assessment of an organization network infrastructure. Using these maturity scores, for example, a cybersecurity maturity manager may identify weakness, strengths, and/or areas of improvement.

In some embodiments, a maturity model is an NIST cyber security framework (CSF) model. In particular, an NIST model may include multiple measurement domains such as an Identify domain, a Protect domain, a Detect domain, a Response domain, and a Recover domain, for measuring cybersecurity with respect to an organization. Thus, a cybersecurity maturity manager may assess a network's ability to identify security vulnerabilities, protect from cybersecurity attacks, detect cybersecurity attacks, respond to cybersecurity attacks, and/or recover from a cybersecurity attack. With respect to a respective measurement domain, various controls may be implemented on a network where a cybersecurity maturity manager may obtain multiple measurements regarding a particular control. As such, these measurements may provide evidence suggesting a level of implementation of a particular control and thus a respective cybersecurity score for that category or measurement domain.

In some embodiments, a cybersecurity maturity manager includes hardware and/or software with functionality to determine one or more maturity scores using one or more maturity models. For example, a maturity score may correspond to an overall cybersecurity maturity state of a network. Likewise, a maturity score may also correspond to a specific measurement domain with respect to a particular maturity model. In another embodiment, a cybersecurity maturity manager may determine a compliance score that a network or network element meets criteria specified by a predetermined security standard. For a compliance score, the predetermined security standard may be used in place of a model.

In some embodiments, a cybersecurity maturity manager includes functionality for transmitting one or more remediation commands (e.g., remediation command (163)) based on one or more cybersecurity maturity scores. In particular, a remediation command may be a network message that causes one or more remediation procedures to be performed automatically by a network element. Examples of remediation procedures include one or more of the following: identifying and closing a network blind spot; installing a software patch with respect to a software vulnerability in a software application or network element; changing configuration settings on a network element; removing a network connection; or adjusting a predetermined workflow or rule associated with a network protocol. In some embodiments, a cybersecurity maturity manager includes a remediation queue that organizes the sequence that remediation procedures are implemented in a network. For example, a remediation queue may be based on an amount of change that a remediation procedure will affect a cybersecurity maturity score.

In some embodiments, a cybersecurity maturity manager includes hardware and/or software that provides a user interface (e.g., user interface Z (151)) to various user devices over a network or in a cloud computing environment. In particular, the user interface may provide parties with the capability to review a cybersecurity assessment or compliance assessment regarding network elements or an organization as a whole. Likewise, a user interface may receive inputs from a user, such as cybersecurity analysts, regarding cybersecurity risks and security protocols. In some embodiments, for example, a cybersecurity maturity manager may include software to provide a graphical user interface for presenting data and/or receiving commands to initiate remediation actions with a network.

Keeping with FIG. 1, a cybersecurity maturity manager may include functionality for generating one or more assessment reports (e.g., assessment report M (161), assessment reports (154)) based on cybersecurity data. In particular, an assessment report may describe one or more cybersecurity maturity scores with respect to one or more maturity models. For example, an assessment report may be based on a C2M2 model and indicate individual scores for various measurement domains. In some embodiments, an assessment report includes score changes with respect to a particular measurement domain from a previous report.

Furthermore, an assessment report may indicate changes with respect to an overall cybersecurity assessment for a network or organization. In some embodiments, the assessment report may describe a corresponding remediation procedure that is scheduled to increase a particular score. Reports may also include updates regarding performance of current remediation procedures. Likewise, a cybersecurity maturity manager may store previous assessment reports (e.g., assessment reports (154) in a database, such as to compare and identify overall performance improvements at periodic intervals. Such assessment reports may be provided to user devices through a dashboard integration to a cybersecurity maturity manager's user interface.

In some embodiments, a network element may host a software probe to inspect a configuration of this network element. Alternatively, the configuration might be extracted from a configuration manager operating on a network that includes the network element.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
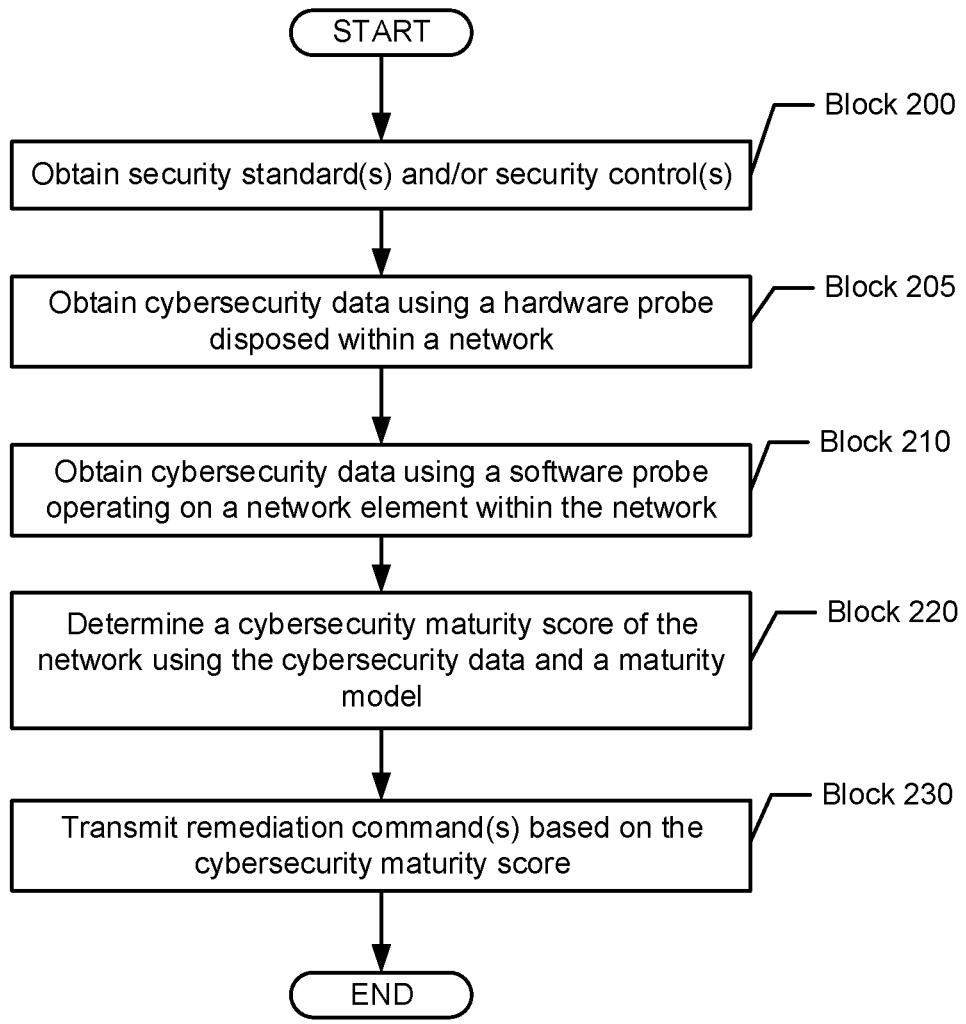
FIG. 2 shows a flowchart in accordance with one or more embodiments.

Turning to FIG. 2, FIG. 2 shows a flowchart in accordance with one or more embodiments. Specifically, FIG. 2 describes a general method for performing a cybersecurity maturity assessment and/or a remediation procedure. One or more blocks in FIG. 2 may be performed by one or more components (e.g., cybersecurity maturity manager (150)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, one or more security standards and/or one or more security controls are obtained in accordance with one or more embodiments. This initial step may identify the security standard(s) and security controls for assessing cybersecurity risks of infrastructure, endpoints, and other organization aspects. Using this security information, hardware probes and software probes may be configured accordingly to collect relevant cybersecurity data applicable for a cybersecurity maturity assessment In Block 205, cybersecurity data is obtained using a hardware probe disposed within a network in accordance with one or more embodiments. More specifically, a hardware probe may be deployed in various locations throughout a network, such as adjacent to network links, at data center boundaries, and inside data centers to gather and analyze network traffic. For example, a hardware probe may monitor user data that traverses a data center.

Furthermore, a hardware probe may include a communication interface that transmits gathered information over a network to a cybersecurity maturity manager. The information may include in-line network data that the hardware probe monitors passively over a network. Subsequently, the cybersecurity maturity manager may analyze the information to determine cybersecurity risks. In some embodiments, the hardware probe performs its own cybersecurity analysis on network traffic to determine cybersecurity risks directly and thus respective cybersecurity data. In some embodiments, a hardware probe is similar to the hardware probes described above in FIG. 1 and the accompanying description.

In Block 210, cybersecurity data is obtained using a software probe operating on a network element within a network in accordance with one or more embodiments. For example, software probes may be deployed in a central location in a data center or on various network elements throughout a network. Furthermore, a software probe may analyze a network element to detect changes in configuration settings for one or more software applications operating on the same network element. As such, a software probe may provide out-of-band communication to a cybersecurity maturity manager regarding cybersecurity risks, such as violations regarding any security standards. Likewise, the software probe may also analyze the network element for any security vulnerabilities, and subsequently notify the cybersecurity maturity manager accordingly. In some embodiments, a software probe is similar to the software probes described above in FIG. 1 and the accompanying description.

In Block 220, a cybersecurity maturity score of a network is determined using cybersecurity data and a maturity model in accordance with one or more embodiments. In particular, cybersecurity data from a hardware probe and/or a software probe may be used as inputs for a scoring metric implemented by a particular maturity model. As such, the output of the maturity model may include one or more cybersecurity maturity scores. For example, a cybersecurity maturity manager may determine a composite score, a weighted score, and/or an average score based on one or more measurement domains provide by a particular model. Likewise, the maturity model may be a CMMI model, a C2M2 model, a customized model for an organization, or any other maturity model described above in regard to FIG. 1 and the accompanying description. In some embodiments, multiple scores are determined using multiple models.

In some embodiments, a cybersecurity maturity manager determines one or more compliance scores for one or more predetermined security standards. For example, a security standard may be an international standard or a customized cybersecurity standard specific to an organization. Likewise, security standards may include various security frameworks as well as specific controls.

In Block 230, one or more remediation commands are transmitted based on a cybersecurity maturity score in accordance with one or more embodiments. In some embodiments, a cybersecurity maturity manager may perform remediation monitoring and/or remediation procedures over a network. More specifically, a cybersecurity maturity manager may track implementation of various remediation procedures, e.g., with a remediation queue, and determine the status of implementing a particular remediation procedure. For example, a cybersecurity maturity manager may schedule different remediation procedures for different times and in a predetermined sequence. This schedule may be controlled and/or adjusted using remediation commands, for example. In some embodiments, a remediation command is similar to the remediation commands described above in FIG. 1 and the accompanying description.

Accordingly, a network element may transmit remediation data to the cybersecurity maturity manager. For example, remediation data may provide a status update regarding one or more remediation procedures being performed on the network element. Thus, in some embodiments, a remediation procedure is performed autonomously using a cybersecurity maturity manager. Likewise, one or more cybersecurity maturity scores may be updated in response to determining completion of a remediation procedure. A cybersecurity maturity manager may further update a cybersecurity assessment of a network or network element without conducting a full assessment again based completion of the remediation procedure. The cybersecurity maturity manager may also conduct incremental assessment as required for specific control standards identified as a gap during the full assessment.

In some embodiments, hardware probes and/or software probes determine maturity scores and/or compliance scores. Accordingly, a hardware probe and/or a software probe may determine remediation commands based on cybersecurity data at the corresponding probe without communication initially with a cybersecurity maturity manager. Thus, a hardware probe or a software probe may initiate a remediation procedure in order to increase a particular cybersecurity maturity score for one or more measurement domains within a network.

Figure 3:
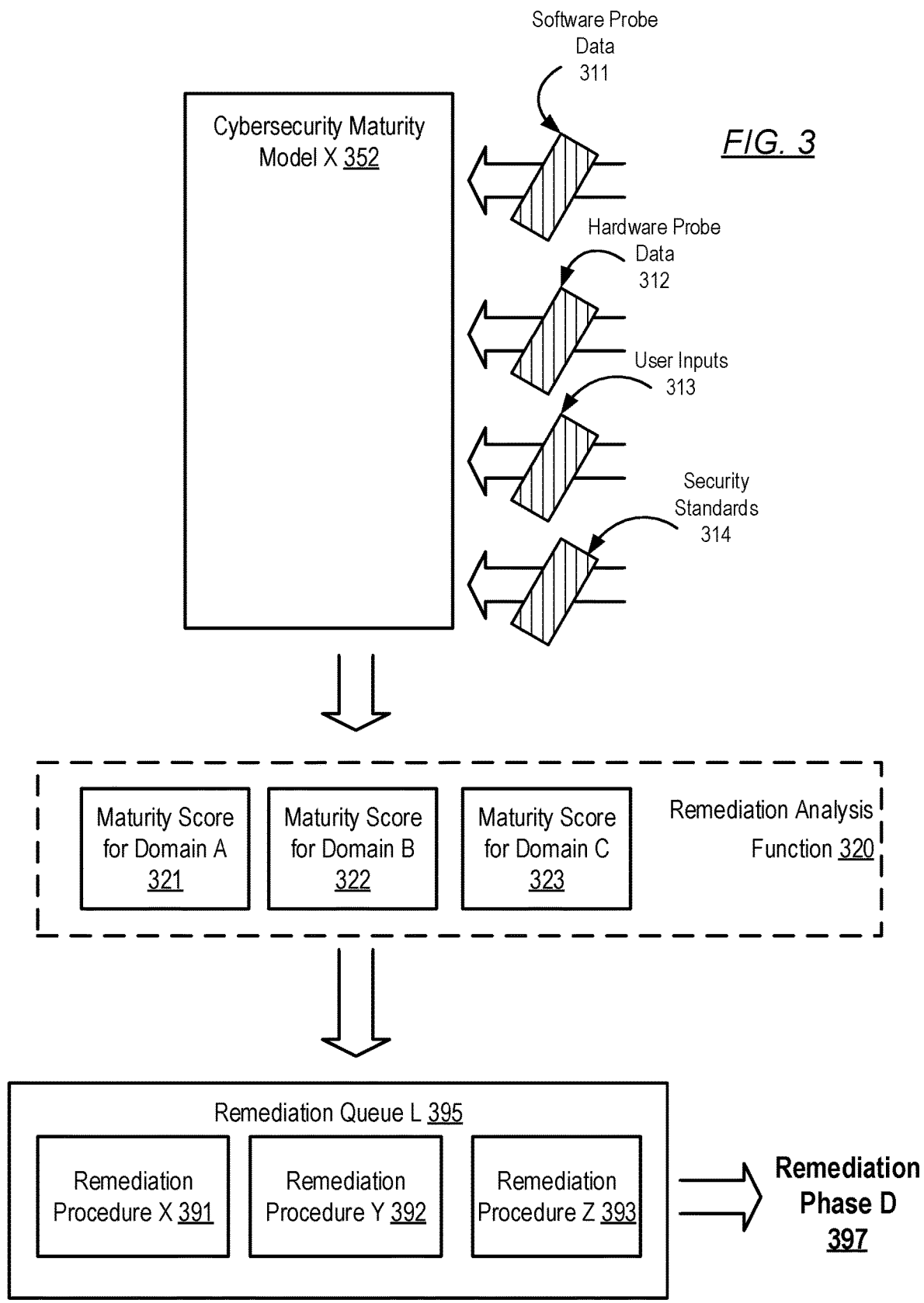
FIG. 3 shows an example in accordance with one or more embodiments.

Turning to FIG. 3, FIG. 3 provides an example of determining remediation procedures in accordance with one or more embodiments. The following example is for explanatory purposes only and not intended to limit the scope of the disclosed technology. In FIG. 3, a maturity model X (352) obtains various inputs over a network, i.e., software probe data (311), hardware probe data (312), various user inputs (313), and various security standards (314). Here, the maturity model X (352) is a customized model that uses a predetermined security standard as an input for determining cybersecurity maturity scores. As shown in FIG. 3, the maturity model X (352) determines various scores for different measurement domains, i.e., a maturity score for domain A (321), a maturity score for domain B (322), and a maturity score for domain C (323).

Keeping with FIG. 3, a cybersecurity maturity manager (not shown) uses a remediation analysis function (320) on the maturity scores (321, 322, 323) to determine various remediation procedures (i.e., remediation procedure X (391), remediation procedure Y (392), remediation procedure Z (393)) to improve an overall cybersecurity assessment of a network and/or enterprise wide. As such, the cybersecurity maturity manager inserts the remediation procedures (391, 392, 393) into a remediation queue L (395). Using the remediation queue L (395), the cybersecurity maturity manager subsequently transmits various remediation commands during a remediation phase D (397) to implement the remediation procedures (391, 392, 393). In some embodiments, a remediation procedure is autonomously implemented by a cybersecurity maturity manager or assigned to a security analyst for manual implementation regarding identified gaps.

Figure 4:
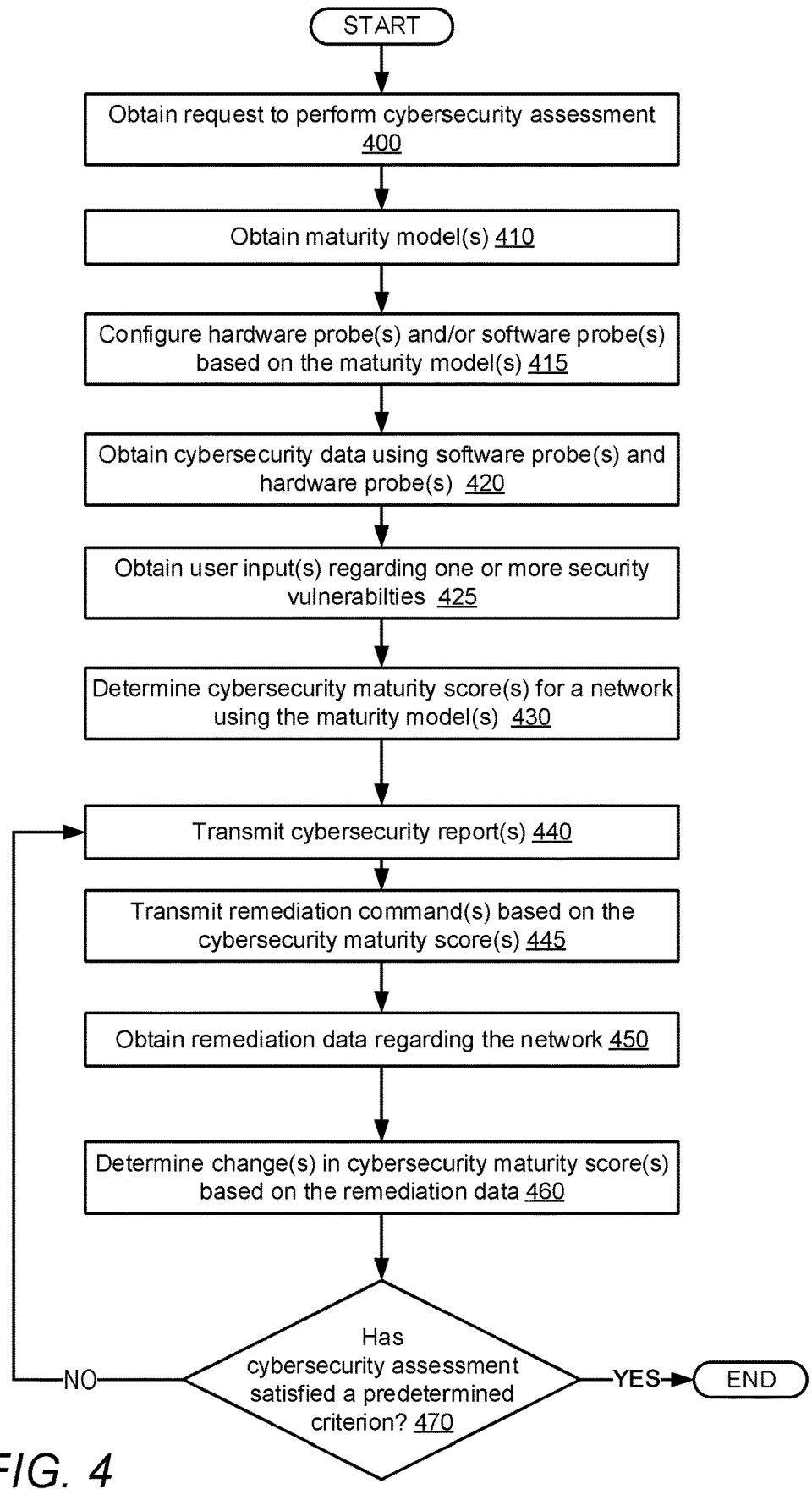
FIG. 4 shows a flowchart in accordance with one or more embodiments.

Turning to FIG. 4, FIG. 4 shows a flowchart in accordance with one or more embodiments. Specifically, FIG. 4 describes a specific method for determining a cybersecurity maturity assessment and/or performing remediation monitoring. One or more blocks in FIG. 4 may be performed by one or more components (e.g., cybersecurity maturity manager (150)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a request to perform a cybersecurity assessment is obtained in accordance with one or more embodiments. For example, a cybersecurity maturity manager may obtain a user input to perform a cybersecurity assessment regarding one or more networks. On the other hand, a cybersecurity assessment may be performed autonomously at predetermined times, e.g., to detect whether any changes have occurred that increase or decrease one or more maturity scores for a network. In some embodiments, the request may designate one or more security standards and/or one or more security controls (e.g., selected by a user) for performing the cybersecurity assessment.

In Block 410, one or more maturity models are obtained in accordance with one or more embodiments. In some embodiments, a request to perform a cybersecurity assessment may designate one or more maturity models for an assessment. Likewise, a user may select a particular maturity model using a graphical user interface provided by a cybersecurity maturity manager. The maturity models may be similar to the maturity models described above in FIG. 1 and the accompanying description.

In Block 415, one or more hardware probes and/or one or more software probes are configured based on one or more maturity models in accordance with one or more embodiments. For example, a maturity model loaded in Block 410 may require specific information that is not included in collected probe data as currently configured. In this case, the cybersecurity maturity manager may adjust or modify one or more configuration settings of one or more probes to obtain this specific information for a maturity model.

In Block 420, cybersecurity data is obtained using one or more software probes and one or more hardware probes in accordance with one or more embodiments. For example, Block 420 may be similar to Blocks 200 and 210 described above in FIG. 2 and the accompanying description.

In some embodiments, an approved document is requested as evidence for implementation of a security requirement, e.g., a particular cybersecurity strategy. In this case, an assessment of configuration settings of a network element may not be sufficient. Accordingly, a software probe may interface directly with a document repository in order to inspect a document's metadata. By doing so, the software probe may autonomously determine if an approved cybersecurity strategy is available.

In Block 425, one or more user inputs are obtained regarding one or more security vulnerabilities in accordance with one or more embodiments. In some embodiments, a cybersecurity assessment uses subjective data provided by a user, such as from a cybersecurity analyst. For data that may be analyzed with an objective metric, a cybersecurity maturity manager may automatically obtain the data using hardware probes and/or software probes. However, a cybersecurity maturity manager may also use a graphical user interface to obtain manually-entered user data to provide flexibility for determining maturity assessments. In some embodiments, a cybersecurity maturity manager transmits a request for feedback regarding a security vulnerability, a security protocol, workflow, etc., to a particular user in order to obtain a user input for use with a maturity assessment.

In Block 430, one or more cybersecurity maturity scores are determined for a network using one or more maturity models in accordance with one or more embodiments. For example, after a cybersecurity maturity manager aggregates, processes, correlates, and/or analyzes data from hardware probes, software probes, and/or user inputs, the cybersecurity maturity manager may generate one or more cybersecurity maturity scores using one or more maturity models. Using the cybersecurity maturity scores, a cybersecurity maturity manager may identify one or more gaps in a network or organization's cybersecurity state. For example, a cybersecurity maturity manager may compare current maturity scores to a desired maturity target as well as determine a recommend remediation action. For example, a cybersecurity maturity manager may determine the difference between current maturity scores and the desired maturity target in order to fashion a series of remediation procedures to reach the desired maturity target.

In some embodiments, a cybersecurity maturity manager determines compliance of one or more security controls requirements mandated by an identified security standard or framework, or policy identified at the beginning of a cybersecurity assessment. As an example, if a specific security standard mandates encryption, a probe analysis may discover which application traffic is encrypted and which application traffic is not. In another example, if a security standard mandates password encryption, hardware probes, software probes, and a cybersecurity maturity manager may perform an analysis identifying that specific application transmitting passwords in clear text. That specific application may be identified as a vulnerability, thus violating the security standard's requirement.

In Block 440, one or more cybersecurity reports are transmitted in accordance with one or more embodiments. For example, a cybersecurity maturity manager may publish maturity scores and/or overall cybersecurity assessment data to user devices through a graphical user interface. Likewise, the cybersecurity maturity manager may provide notifications at predetermined intervals, e.g., once a week, once a month, quarterly, etc., based on changes to individual maturity scores or overall assessment levels. For example, an executive dashboard may be implemented that provides a high-level summary of a cybersecurity assessment using one or more maturity models.

Furthermore, assessment reports and compliance reports may be provided to various user devices. In particular, assessment reports may describe target key performance indicators (KPI) per measurement domain, cybersecurity strengths and deficient areas, and various remediation procedures available for adjusting one or more maturity scores. Assessment reports may be similar to the assessment reports described above in FIG. 1 and the accompanying description. Compliance reports may be similar to assessment reports, but tailored towards compliance with one or more predetermined security standards. In some embodiments, a cybersecurity maturity manager may provide multiple dashboards for various working groups that provide a drill down capabilities to analyze a respective working group's performance.

In some embodiments, cybersecurity data is used to perform various data analytics. For example, data from hardware probes and/or software probes may be used to perform statistics regarding various cybersecurity risks as well as changes in cybersecurity maturity levels. Such data analytics may be included in one or more cybersecurity reports.

Keeping with FIG. 4, Blocks 445-470 describe remediation monitoring workflow that addresses one or more cybersecurity risks through various remediation procedures. In Block 445, one or more remediation commands are transmitted based on one or more cybersecurity maturity scores in accordance with one or more embodiments. In some embodiments, Block 445 may be similar to Block 230 described above in FIG. 2 and the accompanying description.

In Block 450, remediation data is obtained regarding a network in accordance with one or more embodiments. In some embodiments, for example, remediation data may include network communication between various hardware probes, various software probes, various software applications, and hardware devices throughout a network or over an Internet connection to manage implementation of a remediation procedure. In particular, a cybersecurity maturity manager may collect remediation data on active remediation procedures as well as network elements scheduled for future remediation procedures.

Where a remediation procedure includes updating a version of a software application operating on a network element, for example, a cybersecurity maturity manager may monitor the network element until no critical services are being performed by the network element. Once the network element is available for an installation, the cybersecurity maturity manager may automatically update the version of the software application and thus remediate a predetermined cybersecurity risk. Accordingly, a cybersecurity maturity manager may initiate and monitor remediation operations with a network element directly or through a system managing that network element. For example, the cybersecurity maturity manager may request a router to update firmware. Likewise, the cybersecurity maturity manager may require a network management system (NMS) to coordinate remediation operations with the router.

In Block 460, one or more changes in one or more cybersecurity maturity scores are determined based on remediation data in accordance with one or more embodiments. A cybersecurity maturity manager may note when one or more remediation procedures have been performed from remediation data obtained over a network or Internet connection. Once performed, the cybersecurity maturity manager update the associated maturity score for a particular measurement domain accordingly. In some embodiments, the cybersecurity maturity manager may transmit notifications to various user devices describes changes to specific maturity scores and/or changes to an overall cybersecurity assessment.

In Block 470, a determination is made whether a cybersecurity assessment satisfies a predetermined criterion in accordance with one or more embodiments. For example, a predetermined criterion may correspond to a target maturity score or a target maturity level for a network or organization. Thus, a cybersecurity maturity manager may continually identify security vulnerabilities and cybersecurity risks, while subsequently improving the overall cybersecurity assessment of a network. Where a particular maturity score or overall cybersecurity assessment fails to satisfy a predetermined criterion, the process may proceed to Block 440. Where the predetermined criterion is satisfied, the process may end.

In some embodiments, a full cybersecurity assessment is conducted by deploying portable hardware probes and portable software probes only on-site to sample data for a predetermined period of time. Hardware probes and/or software probes may store the sampled data in a database storage that may be moved to a central assessment center. At the central assessment center, a cybersecurity maturity manager may determine one or more maturity scores or an overcall cybersecurity assessment score from the sampled data. In some embodiments, a compact version of a cybersecurity maturity manager is implemented that may be transported to different locations. Once onsite, a cybersecurity maturity manager may collect sampled data to produce a specific assessment report and/or compliance report.

Figure 5A:
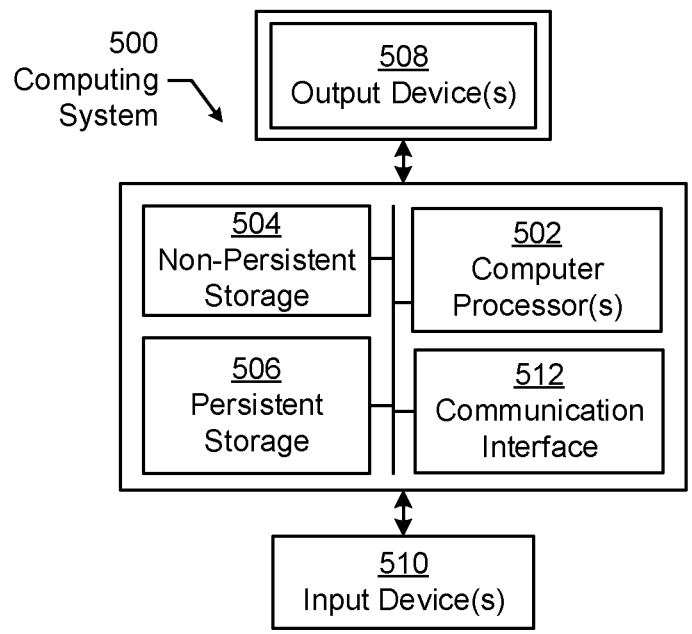
FIGS. 5A and 5B show a computing system in accordance with one or more embodiments.

Embodiments may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 5B:
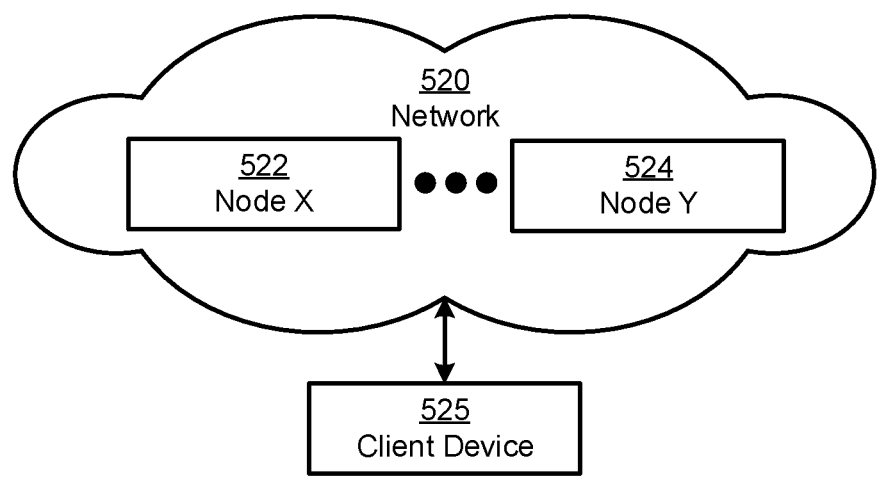

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the disclosure.

The computing system or group of computing systems described in FIGS. 5A and 5B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A–B), and the status flags may be read to determine if the result is positive (i.e., if A>B, then A–B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   obtaining, by a computer processor, first cybersecurity data using a hardware probe disposed within a network, wherein the first cybersecurity data corresponds to an analysis of the hardware probe regarding first network data that is transmitted through the network;
   obtaining, by the computer processor, second cybersecurity data using a software probe operating on a network element within the network, wherein the second cybersecurity data corresponds to an analysis of the software probe regarding one or more configuration settings of the network element;
   determining, by the computer processor, a cybersecurity maturity score using the first cybersecurity data and the second cybersecurity data, wherein the cybersecurity maturity score is based on a maturity model; and
   transmitting, by the computer processor and based on the cybersecurity maturity score, a remediation command configured to adjust at least one configuration setting of the network.

2. The method of claim 1, further comprising:
obtaining, by the hardware probe, a packet that is transmitted over the network;
determining, by the hardware probe, whether the packet comprises a clear text password; and
transmitting, by the hardware probe in response to determining a presence of the clear text password, a message over the network that identifies a transmission of an unencrypted password.

3. The method of claim 1,
wherein the hardware probe is disposed along a network path between a user device and a server,
wherein the hardware probe monitors second network data transmitted along the network path between the user device and the server, and
wherein the hardware probe transmits third cybersecurity data to a cybersecurity maturity manager in response to the second network data failing to satisfy one or more security standards.

4. The method of claim 1,
wherein the network element is a server,
wherein the software probe monitors changes in a plurality of configuration settings on the server, and
wherein the software probe transmits third cybersecurity data to a cybersecurity maturity manager in response to at least one configuration setting among the plurality of security settings failing to satisfy one or more security standards.

5. The method of claim 1,
wherein the maturity model is selected from a group consisting of: a capability maturity model integration (CMMI), a cybersecurity capability maturity model (C2M2), standardization's systems security engineering capability maturity model (SSE-CMM), and National Institute of Standards and Technology cyber security framework (NIST CSF).

6. The method of claim 1, further comprising:
obtaining a predetermined security standard;
obtaining third cybersecurity data regarding the network; and
generating, using the third cybersecurity data, a maturity score based on the predetermined security standard.

7. The method of claim 1,
wherein the cybersecurity maturity score is based on a user input regarding a cybersecurity risk.

8. The method of claim 1, further comprising:
determining whether a change has occurred in a cybersecurity state of the network based on third cybersecurity data and at a predetermined interval;
determining, in response to determining the change has occurred in the cybersecurity state, a second cybersecurity maturity score in response to the change in the cybersecurity state; and
transmitting a report to a user device based on the second cybersecurity maturity score.

9. The method of claim 1,
wherein the first cybersecurity maturity score is provided to a plurality of user devices using a graphical user interface that is provided by a cloud server.

10. A system, comprising:
a network comprising a plurality of network elements;
a hardware probe coupled to the plurality of network elements;
a network element coupled to the plurality of network elements, the network element comprising a software probe; and
a cybersecurity maturity manager comprising a computer processor, wherein the cybersecurity maturity manager is coupled to the hardware probe, the software probe, and the plurality of network elements, and wherein the cybersecurity maturity manager comprises functionality for:
obtaining first cybersecurity data using the hardware probe, wherein the first cybersecurity data corresponds to an analysis of the hardware probe regarding first network data that is transmitted through the network;
obtaining second cybersecurity data using the software probe, wherein the second cybersecurity data corresponds to an analysis of the software probe regarding one or more configuration settings of the network element;
determining a cybersecurity maturity score using the first cybersecurity data and the second cybersecurity data, wherein the cybersecurity maturity score is based on a maturity model; and
transmitting, based on the cybersecurity maturity score, a remediation command configured to adjust at least one configuration setting of the network element.

11. The system of claim 10, wherein the cybersecurity maturity manager further comprises functionality for:
obtaining a predetermined security standard;
obtaining third cybersecurity data regarding the network; and
generating, using the third cybersecurity data, a maturity score based on the predetermined security standard.

12. The system of claim 10, further comprising:
a user device; and
a server, wherein the hardware probe is disposed along a network path between the user device and the server,
wherein the hardware probe is configured to monitor second network data transmitted along the network path, and
wherein the hardware probe is configured to transmit third cybersecurity data to the cybersecurity maturity manager in response to the second network data failing to satisfy one or more security standards.

13. The system of claim 10,
wherein the hardware probe is configured to obtain a packet that is transmitted over the network, and
wherein the hardware probe is configured to perform a packet analysis on the packet to determine a presence of a clear text password.

14. The system of claim 10,
wherein the network element is a server,
wherein the software probe is configured to monitor changes in a plurality of configuration settings on the server, and
wherein the software probe is configured to transmit third cybersecurity data to a cybersecurity maturity manager in response to at least one configuration setting among the plurality of security settings failing to satisfy one or more security standards.

15. The system of claim 10,
wherein the maturity model is selected from a group consisting of: a capability maturity model integration (CMMI), a cybersecurity capability maturity model (C2M2), standardization's systems security engineering capability maturity model (SSE-CMM), and National Institute of Standards and Technology cyber security framework (NIST CSF).

16. A non-transitory computer readable medium storing instructions executable by a computer processor, the instructions comprising functionality for:
- obtaining first cybersecurity data using a hardware probe disposed within a network, wherein the first cybersecurity data corresponds to an analysis of the hardware probe regarding first network data that is transmitted through the network;
- obtaining second cybersecurity data using a software probe operating on a network element within the network, wherein the second cybersecurity data corresponds to an analysis of the software probe regarding one or more configuration settings of the network element;
- determining a cybersecurity maturity score using the first cybersecurity data and the second cybersecurity data, wherein the cybersecurity maturity score is based on a maturity model; and
- transmitting, based on the cybersecurity maturity score, a remediation command configured to adjust at least one configuration setting of the network.

17. The non-transitory computer readable medium of claim 16, wherein the instructions further comprise functionality for:
- obtaining a predetermined security standard;
- obtaining third cybersecurity data regarding the network; and
- generating, using the third cybersecurity data, a maturity score based on the predetermined security standard.

18. The non-transitory computer readable medium of claim 16,
- wherein the hardware probe is disposed along a network path between a user device and a server,
- wherein the hardware probe monitors second network data transmitted along the network path between the user device and the server, and
- wherein the hardware probe transmits third cybersecurity data to a cybersecurity maturity manager in response to the second network data failing to satisfy one or more security standards.

19. The non-transitory computer readable medium of claim 16,
- wherein the maturity model is selected from a group consisting of: a capability maturity model integration (CMMI), a cybersecurity capability maturity model (C2M2), standardization's systems security engineering capability maturity model (SSE-CMM), and National Institute of Standards and Technology cyber security framework (NIST CSF).

20. The non-transitory computer readable medium of claim 16, wherein the instructions further comprise functionality for:
- determining, at a predetermined interval, whether a change has occurred in a cybersecurity state of the network based on third cybersecurity data;
- determining, in response to determining the change has occurred in the cybersecurity state, a second cybersecurity maturity score in response to the change in the cybersecurity state; and
- transmitting a report to a user device based on the second cybersecurity maturity score.

* * * * *